United States Patent [19]

Bohmrich et al.

[11] 4,032,311
[45] June 28, 1977

[54] TANK FILTER

[75] Inventors: Jack L. Bohmrich; William A. Bowden, Jr., both of Glenview; Vernon G. Pedersen, Chicago, all of Ill.

[73] Assignee: Dacor Corporation, Northfield, Ill.

[22] Filed: June 1, 1976

[21] Appl. No.: 691,389

[52] U.S. Cl. .............................. 55/385 C; 55/418; 55/505; 128/203; 137/592
[51] Int. Cl.² ....................................... B01D 50/00
[58] Field of Search ................. 55/309, 310, 385 C, 55/418, 417, 420, 498, 505, 527; 220/371, 372; 128/142.2, 142, 145.8, 203; 137/549, 590, 592

[56] References Cited
UNITED STATES PATENTS

| 2,510,712 | 6/1950 | Olowinski | 128/203 |
| 3,033,911 | 5/1962 | Duddy | 55/505 |
| 3,148,965 | 9/1964 | Summerfield | 55/420 |
| 3,708,965 | 1/1973 | Domnick | 55/498 |
| 3,767,054 | 10/1973 | Farrow et al. | 55/498 |
| 3,854,498 | 12/1974 | Ueckey | 137/590 |
| 3,918,942 | 11/1975 | Rechsteing et al. | 55/385 R |
| 3,977,560 | 8/1976 | Stumpf et al. | 220/371 |

Primary Examiner—Bernard Nozick
Attorney, Agent, or Firm—Edmond T. Patnaude

[57] ABSTRACT

A filter formed of minute fibers of borosilicate glass is mounted to the inlet-outlet valve of a rechargeable pressure vessel to remove entrained particles from fluid entering and exiting the vessel.

6 Claims, 4 Drawing Figures

TANK FILTER

The present invention relates in general to a filtration system for rechargeable pressure vessels, and it relates in particular to a new and improved filter and valve assembly for use with the air supply tanks used in scuba diving.

BACKGROUND OF THE INVENTION

Scuba type air supply tanks are pressurizable aluminum or steel cylinders having a single port through which the cylinder is charged and through which air is later supplied to the diver for use in breathing. The port is internally threaded and a manual control valve is mounted therein. The usual control valve includes an elongated tube which extends a few inches into the tank to prevent sediment or liquid from exiting the tank.

In order to prevent foreign matter from entering the tank during the charging operation it is common practice to connect a filter between the outlet of the compressor and the control valve. Unfortunately, this filter is not always used, and as a result, impurities do on occasion enter the tanks. Also, corrosion within the tank itself can result in sediment being formed in the tank and being entrained in the air supplied therefrom to the diver.

SUMMARY OF THE INVENTION

Briefly, there is provided in accordance with the present invention a novel filtration system which is mounted to the valve housing and disposed within the tank. The filter medium is a porous mass of fibers which captures and holds particles by intermolecular forces of attraction. Accordingly, entrained particles are captured and thus removed from the air entering as well as leaving the tank. The spacing between the fibers is considerably greater than the size of the particles to be removed so that the captured particles do not interfere to any appreciable extent with the flow of air through the filter medium. Being located within the tank, the filter medium is protected from physical damage and does not add to the size of the breathing gear carried by the diver.

In accordance with another facet of the invention, the novel filtration system employs a filter unit which is easily mounted to most present day tank valves whereby the invention may be employed without replacing the tank valves which are now in use.

BRIEF DESCRIPTION OF THE DRAWING

Further objects and advantages and a better understanding of the present invention can be had by reference to the following detailed description, wherein.

DETAILED DESCRIPTION OF THE INVENTION

Figure 1:
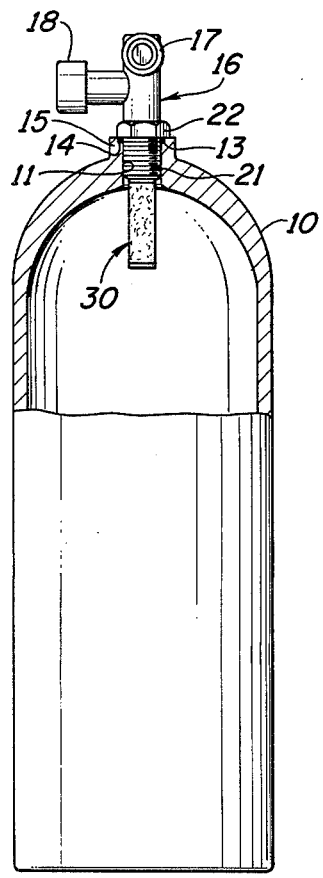
FIG. 1 is a partial cross-sectional view of a valve and filter assembly mounted to a scuba type pressure vessel or tank.
Figure 2:
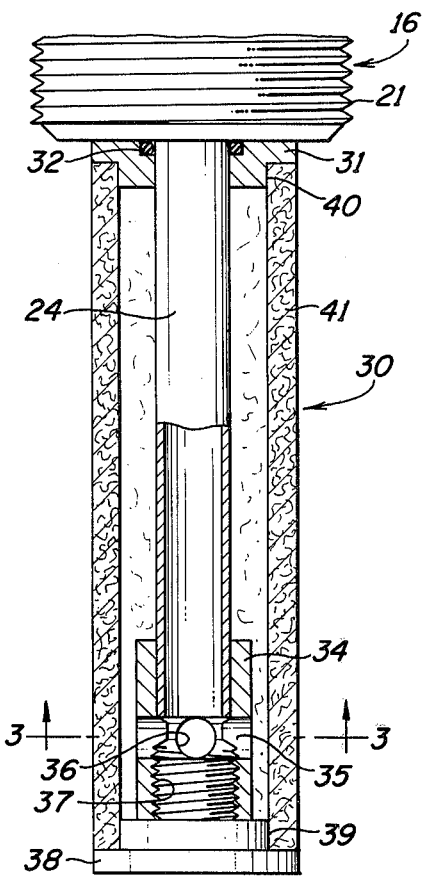
FIG. 2 is an enlarged view, partially in cross-section, of the filter assembly of FIG. 1.
Figure 3:
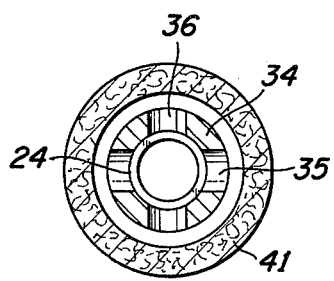
FIG. 3 is a sectional view taken along the line 3—3 of FIG. 2, assuming the entire device to be shown therein.
Figure 4:
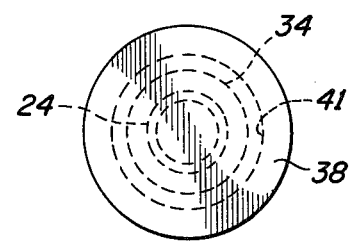
FIG. 4 is an end view of the filter assembly taken from within the pressure vessel.

Referring now to the drawing and particularly to FIG. 1 thereof, a pressure vessel 10 in the form of a cylinder has a single opening 11 at the top through which pressurized fluid enters and exits the vessel. The port 11 is internally threaded and a resilient O-ring sealing member 13 is provided in an annular groove 14 in a boss 15 at the top of the tank. A manually operable control valve 16 of a type well known in the art has an outlet port 17 which is adapted to be connected through suitable pressure reducing mechanisms to the mouthpiece of the driver. A manually operable knob 18 is provided to open and close the valve. The housing 16 includes an externally threaded connector 21 which is threaded into the port 11 and a hexagonal enlargement 22 for receiving a wrench overlies the sealing ring 13 to provide a hermetic seal between the housing of the valve and the body of the tank 10. As best shown in FIG. 2, a tube 24 extends from the portion 21 of the valve 16. The bore through the tube 24 is connected to a passageway in the housing 16 and to the inlet-outlet connector 17 through the valve mechanism which is controled by the knob 18. The tube 24 is generally referred to as a snorkle tube and extends a distance of about one and one half inches into the tank. As thus far described the system is standard in scuba diving systems.

In accordance with the present invention a filtration system 30 is mounted to the snorkel tube 24 and has an external size to permit it to be inserted into the tank 10 as illustrated in FIG. 1.

As best shown in FIG. 2, the filter assembly 30 comprises a washer-like end seal member 31 which is press fitted onto the snorkel tube 24 against the inner end of the section 21 of the valve housing. An O-ring sealing member 32 is fitted in an annular groove in the sealing member 31 and is compressed against the housing portion 21 so as to provide a hermetic seal between the tube 24 and the seal member 31. A filter adapter sleeve 34 is press fitted onto the end of the tube 24 and is provided with a pair of cross drilled transverse openings 35 and 36 disposed just inwardly of the distal end of the snorkel tube 24. The sleeve 34 is provided with an internal thread 37 which receives the externally threaded end portion of an imperforate end cap 38 having an annular groove or rabbet 39 which is aligned with a similar annular groove 40 in the end seal member 31 when the cap 38 is threaded into the outer end of the adapter sleeve 34. A tubular filter member 41 has its ends respectively positioned in the grooves 39 and 40, and with the cap 38 threaded tightly into the adapter sleeve 34 the tube 41 is slightly compressed between the end seal member 31 and the cap 38 so as to provide sealing engagement between the respective ends of the tube 41 and the members 31 and 38. The internal diameter of the filter tube 41 is substantially greater than the external diameter of the adapter 34 so that fluid may freely flow into and out of openings 35 and 36 in the adapter sleeve.

The sleeve 41 is formed of a porous mass of material to which particles are attracted by means of intermolecular forces of attraction between the particles and the filter fibers. One such material is sold by Balston, Inc., of Lexington, Massachusetts under the Trademark MICROFIBRE and comprises borosilicate glass microfibers bonded into a cylindrical tube. It is important that the material used for the filter 41 have a porosity size which is substantially greater than the size of the particles which are to be captured thereby, so that the particles removed from the fluid passing therethrough does not interfere with the subsequent flow of air to the diver. Also, it is important that the captured particles not later be released into the air when the diver is subsequently breathing.

In use, the filter assembly 30 is attached to the snorkel tube 24 of a conventional scuba tank valve and since the external diameter of the filter assembly is less than the internal diameter of the port 11 it freely extends into the tank 10. The filter assembly remains on the valve 16 and thus in the tank 10 at all times. In this position the filter thus filters the air entering the tank as well as filtering the air exiting the tank. In this way should there be an undesirable condition at the compressor, sediment is not supplied into the tank. Also, any sediment which forms in the tank itself is prevented from reaching the diver. In addition to the advantage that the filter is protected by the tank from physical damage, being within the tank, it is in use at all times and there is no chance that the person charging the tank might forget to connect the filter between the tank and the compressor. Finally, inasmuch as the filter is located within the tank it does not increase the size of the breathing gear which must be carried by the diver.

While the present invention has been described in connection with a particular embodiment thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed is:

1. In combination,
a pressurizable vessel having a single inlet-outlet port,
manually operable valve means including a housing having a valve passageway therethrough sealably mounted to said vessel across said port,
said valve means including a tube connected to said passageway and extending through said port into said vessel,
said tube having an open distal end for communicating said valved passageway with the chamber in said vessel,
a tubular filter member comprising a mass of minute fibrous members having surfaces against which particles are held by intermolecular forces of attraction irrespective of the direction of fluid flow therethrough to remove entrained particles from fluid entering and exiting the vessel,
said filter member being positioned over said tube in spaced concentric relationship therewith to provide an annular chamber disposed between said tube and said filter member,
a tubular connector press fitted onto the distal end of said tube and having a laterally extending hole therethrough communicating with the open distal end of said tube for connecting said passageway to said annular chamber, and
end cap means removably secured to said connector and holding said filter member in place over said tube in sealing relationship with said housing.

2. The combination according to claim 1 wherein said port is circular in cross-section,
said filter member is cylindrical, and
the external diameter of said filter member is less than the internal diameter of said port.

3. The combination according to claim 1 wherein said end cap means is threadedly mounted to said tubular connector.

4. The combination according to claim 1, comprising a sealing member surrounding said tube and sealingly engaging said housing,
said filter member being held in compression between said sealing member and said end cap means.

5. The combination according to claim 4 comprising a sealing member interposed between said filter member and said valve means,
the opposing surfaces of said sealing member and said end cap means are respectively provided with aligned annular rabbets, and
the ends of said tubular filter member are respectively disposed in said rabbets.

6. The combination according to claim 4 comprising a resilient O-ring compressed between said tube, said sealing member and said valve means.

* * * * *